UNITED STATES PATENT OFFICE 2,564,241

EXTRACTION PROCESS FOR CERIUM

James C. Warf, Los Angeles, Calif., assignor to the United States of America as represented by the United States Atomic Energy Commission No Drawing. Application May 12, 1949,
Serial No. 92,956

23 Claims. (Cl. 75—89)

This invention deals with the separation of cerium from aqueous solutions by solvent extraction, and, in particular, with the separation of cerium from elements commonly associated therewith, including the other rare earth elements. The invention also relates to the extraction of cerium from said solvent. Furthermore, the invention deals with the preparation of pure cerium dioxide, pure cerium salts, and with a process of purifying cerium compounds.

It is an object of this invention to provide a porcess for the separation of cerium by solvent extraction.

It is another object of this invention to provide a process for separating cerium from an organic solvent solution thereof.

In accordance with this invention, cerium may be easily separated from the other rare earth elements and other materials associated therewith by extracting it in its tetravalent state from an acid solution by means of a substantially water-immiscible alkyl phosphate. In this extraction process, the addition of a salting-out agent has a very advantageous effect on the distribution coefficient of Ce(IV) in favor of the solvent phase, and thus increases the yield of cerium. The term "salting-out agent" is to comprise any inorganic compound which is highly soluble in water and which, when added in sufficient amounts to an aqueous cerium salt solution, promotes the interchange of said cerium salt into an organic solvent therefor.

In choosing the solvent suitable for the process of this invention, care had to be taken that the solvent is not attacked by the strong oxidizing power of the tetravalent cerium which would result in the reduction of the cerium to the non-extractable trivalent stage. Alkyl phosphates were found to be satisfactorily resistant to the oxidizing influence of cerium and also to have a high extraction potency. These properties make alkyl phosphates ideally suitable for the extraction of tetravalent cerium salts. Among the many alkyl phosphates suitable for the process of this invention, tributyl phosphate and di-octyl phenylphosphonate were found to be preferable; however, other phosphates, such as tri-octyl phosphate, dioctyl hydrogen phosphate, trihexyl phosphate, and octadecyl dihydrogen phosphate, for instance, are also satisfactory. Likewise, didodecyl phenylphosphonate and di-hexyl phenylphosphonate were found to be suitable alkyl phosphates.

The following datum exemplifies the stability of tributyl phosphate, for instance, toward Ce (IV): A solution 0.5 M in Ce (IV) nitrate, 1 M in $HNO_3$ and 1 M in $NH_4NO_3$ was allowed to stand twenty-four hours; only 3.4% of the Ce (IV) had been reduced. The phosphonates showed a similarly high stability as will be obvious from the extraction results given later.

As has been mentioned above, the process has to be carried out in an acid aqueous solution. Mineral acids, e. g., hydrochloric acid and nitric acid are preferred; however, the most favorable results were obtained with nitric acid. While the acid concentration may range from 1 to 6 M, a concentration of from 3 to 6 M is preferred. The acid solution of the cerium salt may be obtained directly by dissolving cerium or its oxide, or it may be obtained by the addition of the desired amount of concentrated acid to an aqueous solution of cerium salt. When free acid is used, it is preferred that the concentration be at least 2 M; however, the initial concentration of the acid is by no means critical.

In the extraction process of the present invention a highly water-soluble nitrate or chloride, and nitric acid or hydrochloric acid have been used as salting-out agents. Other inorganic salts that are very soluble in water have been found to be suitable as the salting-out agents. It is preferred to employ one or a mixture of any of the following metal nitrates: $NaNO_3$, $Ca(NO_3)_2$, $KNO_3$, $Sr(NO_3)_2$, $LiNO_3$, $Mg(NO_3)_2$, $NH_4NO_3$, $La(NO_3)_3$, $Mn(NO_3)_2$, $Al(NO_3)_3$. Calcium nitrate was found to yield especially good results. The actual molar concentration desirable for the inorganic salt used will depend upon the valence of the cation and the concentration of the anion desired. In general, the salt concentration ranges between 3 and 12 M.

In most cases, it is desirable to have a metal salt, such as a metal nitrate, together with free mineral acid, such as nitric acid or hydrochloric acid, present in the solution to be treated. It is preferred that the metal salt be the predominant component of the mixture of salting-out agents. For example, when the aqueous solution is 1 M $HNO_3$, it is desirable to employ a concentration of a univalent nitrate of at least 3 M, and preferably of from 3 to 12 M. Equivalent concentrations of polyvalent nitrates are employed at the same acid concentration. With increase or decrease in acid strength the salt concentration is accordingly decreased or increased, respectively, to provide an equivalent anion concentration for the salting out of cerium. When other water-soluble inorganic salts are used, they are added in quantities such as to provide equivalent concentrations.

The concentration of the ceric salt in the aqueous solution to be treated with the extracting solvent may be varied greatly; for example, ceric nitrate was extracted satisfactorily from aqueous solutions having concentrations ranging from 0.2 to about 2 M.

It will be understood that in case that the cerium salt to be recovered is in the trivalent stage, oxidation is carried out prior to extraction. This may be accomplished either by electrolysis or by chemical methods. Bromate in strong nitric acid, in particular sodium bromate in 8 to 10 M nitric acid, proved especially satisfactory for the oxidation of Ce (III) to Ce (IV).

While the extraction of cerium salts by means of alkyl phosphates is one embodiment of the invention, another embodiment thereof consists in the extraction of cerium salts from organic solutions by means of water or water containing a reducing agent. Still another embodiment of the invention is the combination of the two above-mentioned embodiments.

In order to study the effect of changes in the concentrations of the various ingredients on the operativeness of the process, a number of experiments were carried out using ceric nitrate as the salt to be treated, ammonium nitrate as the salting-out agent, and nitric acid as the acid. The results of these experiments are compiled in the following table:

Table

| Concn. Ce (IV) molarity | Concn. NH$_4$NO$_3$ molarity | Concn. HNO$_3$ molarity | Volume aqueous phase, ml. | Volume tributyl phosphate phase, ml. | Per Cent Ce Extracted |
|---|---|---|---|---|---|
| 0.5 | 3 | 1 | 10 | 10 | 98 |
| .5 | 1 | 0 | 10 | 10 | 95 |
| .5 | 1 | 1 | 10 | 10 | 98–99 |
| .01 | 0.02 | 1 | 100 | 10 | 84 |
| .01 | 1 | 1 | 100 | 10 | 87 |
| .001 | 1 | 3 | 100 | 10 | 60 |

The degree of extraction was determined by titrating the organic phase with ferrous sulfate. The table shows that the conditions for satisfactory extraction are not critical. However, the presence of free nitric acid facilitates the separation of the organic and aqueous phases.

Satisfactory amounts of cerium are extracted by alkyl phosphates from solutions up to 6 M in nitric acid, 0.02 to 5 M in ammonium nitrate and up to 1 M in ceric nitrate. Concentrations of ammonium nitrate above about 5 M and of nitric acid above about 6 M improve the extractions only slightly, which reduces the amount of ceric nitrate that can be dissolved in the aqueous phase.

The extraction of cerium salts by means of dioctyl phenylphosphonate is illustrated by the following example.

Ten ml. of a solution containing 0.3 M ceric nitrate, 4 M NH$_4$NO$_3$ and 3 M HNO$_3$ was shaken with 10 ml. dioctyl phenylphosphonate. The cerium content of the solvent phase was ascertained by titration. The analysis showed that 99% of the cerium nitrate of the aqueous solution had been extracted by the solvent.

The degree of separation of cerium from other metals as they occur in practice, for instance in the recovery of cerium from natural minerals, was also determined. For this purpose 100 ml. of an aqueous solution was used which had concentrations of 1 M ammonium nitrate and of 1 M nitric acid and which contained varying amounts of iron, zirconium, and lanthanum nitrates, the latter two sometimes as radioactive isotopes. The tributyl phosphate layer (100 ml.), after extraction, was washed four times with 25 ml. portions of solutions M in NH$_4$NO$_3$ and M in HNO$_3$, and re-extracted with hydrogen peroxide (100 ml., 0.5 M in HNO$_3$, and 1% H$_2$O$_2$). The aqueous solution was washed twice with carbon tetrachloride to remove traces of butyl phosphate, and analyzed for iron, zirconium, or lanthanum. Iron analyses were carried out spectrophotometrically using 1, 10-phenanthroline, and zirconium and lanthanum analyses were made gravimetrically or radiometrically (Zr$^{95}$, half-life 65 days, and La$^{140}$, half-life 40 hours). The quotient, $$\frac{\text{Mg. in original aqueous phase}}{\text{Mg. from organic phase}}$$

was taken as a "separation factor." It is varied from 1500 to 1,700,000 for the iron salt, from about 200 to 600 for the zirconium salt, and amounted to about 100 for the lanthanum salt.

In order to recover the cerium from the alkyl phosphate solution, the cerium was first reduced to its trivalent state. For this purpose a reducing agent, preferably in the form of an aqueous solution, was added. By shaking the mixture thus obtained, or contacting the organic solvent phase with the reducing agent in any other conventional manner, the cerium was back-extracted by the aqueous phase. Any residual solvent was then removed from the aqueous phase, after separation from the organic phosphate phase, by treating it with a solvent, such as benzene or carbon tetrachloride. The cerium was then recovered from the aqueous solution by any of the known methods, for instance in the form of pure cerium dioxide by evaporating the water and igniting the cerium salt or by precipitating it as cerium oxalate. In any case, a cerium product was obtained which was practically free from phosphorus, the phosphorus content always being less than 1000 P. P. M.

For converting the ceric salts to the cerous stage, any reducing agent is suitable whose oxidation-reduction couple is more positive than −1.61 volts, referred to the hydrogen gas-hydrogen ion couple as zero. Among those reducing agents found especially satisfactory are hydroxylamine, hydrazine, ferrous sulfate, glucose, and formaldehyde; hydrogen peroxide also functions as a reducing agent in the case of a ceric salt solution.

By the use of these combination processes, cerium is purified, and an aqueous solution of pure cerium salt is obtained in all cases. The cerium salt can then be converted to the metal by conventional means such as by treating the oxide obtained with HF to produce CeF$_4$ and by then reducing the CeF$_4$ with an alkali or alkaline earth metal such as calcium.

Well-known extraction procedures and apparatus may be used in carrying out the process of the present invention. Thus, the extraction steps may be effected by the use of batch, continuous batch, batch countercurrent, or continuous countercurrent methods. An especially efficient extraction is obtained using the continuous countercurrent method of extraction. In all cases the ratio of liquid organic solvent to initial aqueous solution may vary widely and the optimum ratio will depend upon the particular organic solvent and the concentrations used. Ratios of between 1:10 and 10:1 are preferred. The organic solvent may be either the dispersed phase or the continuous phase, the former, however, being the preferred type.

The foregoing illustrations and embodiments of this invention are not intended to restrict its scope, which is to be limited entirely by the appended claims.

What is claimed is:

1. A method of separating tetravalent cerium salts from aqueous acid solutions, comprising contacting said aqueous solution with a substantially water-immiscible alkyl phosphate whereby said cerium salt is extracted by said phosphate, and separating said organic solvent phase from said aqueous phase.

2. A method of separating tetravalent cerium salts from rare earth metal salts, comprising converting said salts to an acidified aqueous solution thereof, contacting said aqueous solution with alkyl phosphate whereby said cerium salt is extracted by said phosphate, and separating said organic solvent phase from said aqueous phase.

3. A method of separating tetravalent cerium salts from acidified aqueous solutions, comprising adding an inorganic salt highly soluble in water to said aqueous solution in amounts promoting the interchange of said cerium salt into an organic solvent therefor, contacting said aqueous solution with alkyl phosphate whereby said cerium salt is extracted by said phosphate, and separating said organic solvent phase from said aqueous phase.

4. A method of separating tetravalent cerium salts from aqueous solutions, comprising adding mineral acid to said aqueous solution, adding an inorganic compound highly soluble in water to said aqueous solution in amounts promoting the interchange of said cerium salt into an organic solvent therefor, contacting said aqueous solution with alkyl phosphate whereby said cerium salt is extracted by said phosphate, and separating said organic solvent phase from said aqueous phase.

5. A method of separating tetravalent cerium salts from aqueous solutions, comprising adding hydrochloric acid to said aqueous solution, adding an inorganic salt highly soluble in water to said aqueous solution in amounts promoting the interchange of said cerium salt into an organic solvent therefor, contacting said aqueous solution with alkyl phosphate whereby said cerium salt is extracted by said phosphate, and separating said organic solvent phase from said aqueous phase.

6. A method of separating tetravalent cerium salts from aqueous solutions, comprising adding nitric acid to said aqueous solution, adding an inorganic salt highly soluble in water to said aqueous solution in amounts promoting the interchange of said cerium salt into an organic solvent therefor, contacting said aqueous solution with alkyl phosphate whereby said cerium salt is extracted by said phosphate, and separating said organic solvent phase from said aqueous phase.

7. A method of separating tetravalent cerium salts from aqueous solutions, comprising adding nitric acid to said aqueous solution so as to obtain a nitric acid concentration of up to 6 M, adding an inorganic salt highly soluble in water to said aqueous solution in amounts promoting the interchange of said cerium salt into an organic solvent therefor, contacting said aqueous solution with alkyl phosphate whereby said cerium salt is extracted by said phosphate, and separating said organic solvent phase from said aqueous phase.

8. The method of claim 7 in which the salt is an alkali nitrate.

9. The method of claim 8 in which the alkali nitrate is ammonium nitrate.

10. The method of claim 7 in which the salt is an alkaline earth nitrate.

11. The method of claim 10 in which the alkaline earth nitrate is calcium nitrate.

12. A method of separating tetravalent cerium salts from aqueous solutions, comprising adding nitric acid to said aqueous solution so as to obtain a concentration in said aqueous solution of about 1 M nitric acid, adding an inorganic salt highly soluble in water to said aqueous solution in amounts promoting the interchange of said cerium salt into an organic solvent therefor, contacting said aqueous solution with alkyl phosphate whereby said cerium salt is extracted by said phosphate, and separating said organic solvent phase from said aqueous phase.

13. A method of separating tetravalent cerium salts from aqueous solutions, comprising adding nitric acid to said aqueous solution so as to obtain a concentration of up to 6 M nitric acid, adding a nitrate in a quantity so as to obtain a concentration of from 0.02 to 5 M of said nitrate, contacting said aqueous solution with alkyl phosphate whereby said cerium salt is extracted by said phosphate, and separating said organic solvent phase from said aqueous phase.

14. A method of separating tetravalent cerium salt from aqueous solutions, comprising adding nitric acid and a nitrate in such quantities that a concentration is obtained in the solution ranging from 0.001 to 2 M for the cerium salt, from 0.02 to 5 M for the nitrate, and up to 6 M for the nitric acid, contacting said aqueous solution with alkyl phosphate whereby said cerium salt is extracted by said phosphate, and separating said organic solvent phase from said aqueous phase.

15. A method of separating tetravalent cerium salt from aqueous solutions, comprising adding nitric acid and a nitrate in such quantities that a concentration is obtained in the solution ranging from 0.001 to 2 M for the cerium salt, from 0.02 to 5 M for the nitrate, and up to 6 M for the nitric acid, contacting said aqueous solution with tributyl phosphate whereby said cerium salt is extracted by said phosphate, and separating said organic solvent phase from said aqueous phase.

16. A method of separating tetravalent cerium salt from aqueous solutions, comprising adding nitric acid and a nitrate in such quantities that a concentration is obtained in the solution ranging from 0.001 to 2 M for the cerium salt, from 0.02 to 5 M for the nitrate, and up to 6 M for the nitric acid, contacting said aqueous solution with dioctyl phenyl-phosphonate whereby said cerium salt is extracted by said phosphonate and separating said organic solvent phase from said aqueous phase.

17. A method of separating tetravalent cerium salt from aqueous solutions, comprising adding nitric acid and ammonium nitrate in such quantities that the concentration obtained in the solution will be approximately 0.5 M for the ceric nitrate, about 1 M for the ammonium nitrate, and about 1 M for the nitric acid, contacting said aqueous solution with about an equal volume of tributyl phosphate whereby said cerium salt is extracted by said phosphate, and separating said organic solvent phase from said aqueous phase.

18. A method of preparing pure cerium dioxide from an impure cerium compound, comprising converting said cerium compound into an aqueous ceric solution; adding nitric acid and a nitrate to said aqueous solution in quantities so as to adjust the concentrations to range from 0.2 to 2 M for the cerium salt, from 0.02 to 5 M for said nitrate, and up to 6 M for the nitric acid; contacting said aqueous solution with alkyl phosphate whereby said cerium salt is extracted by said phosphate; separating said organic solvent phase from said aqueous phase; reducing the ceric salt in said organic phase to the cerous stage by adding an aqueous solution of a reducing agent, whereby the cerous salt formed is extracted by said aqueous solution; separating said aqueous phase from said phosphate phase; removing traces of phosphate from said aqueous phase by treating it with a substantially water-immiscible organic solvent for said phosphate; removing said solvent phase from said aqueous phase; evaporating the water from said aqueous phase; and igniting the residue formed.

19. The process of claim 18 in which the reducing agent is hydrogen peroxide.

20. A method of preparing pure cerium metal from an impure cerium compound, comprising converting said cerium compound into an aqueous ceric solution; adding nitric acid and a nitrate to said aqueous solution in quantities so as to adjust the concentrations to range from 0.2 to 2 M for the cerium salt, from 0.02 to 5 M for said nitrate, and up to 6 M for the nitric acid; contacting said aqueous solution with alkyl phosphate whereby said cerium salt is extracted by said phosphate; separating said organic solvent phase from said aqueous phase; reducing the ceric salt in said organic phase to the cerous stage by adding an aqueous solution of a reducing agent, whereby the cerous salt formed is extracted by said aqueous solution; separating said aqueous phase from said phosphate phase; removing traces of phosphate from said aqueous phase by treating it with a substantially water-immiscible organic solvent for said phosphate; removing said solvent phase from said aqueous phase; precipitating the cerium as the oxalate by the addition of calcium oxalate to said aqueous solution; igniting the precipitate thus formed whereby pure cerium dioxide is obtained; treating said cerium dioxide with hydrofluoric acid, whereby cerium fluoride is formed; and then reducing said cerium fluoride with a metal selected from the group consisting of alkali metal and alkaline earth metal.

21. A method of separating cerium salts from alkyl phosphate solutions thereof, comprising contacting said solution with water whereby said cerium salt is extracted into the water, and separating an aqueous phase from an organic solvent phase.

22. A method of separating ceric salts from alkyl phosphate solutions thereof, comprising contacting said solution with water containing a reducing agent whereby said ceric salt is reduced to the cerous salt and extracted into the aqueous solution, and separating an aqueous phase from an organic solvent phase.

23. The process of claim 22 in which the alkyl phosphate is tributyl phosphate and the reducing agent is hydrogen peroxide.

JAMES C. WARF.

REFERENCES CITED

The following references are of record in the file of this patent:

UNITED STATES PATENTS

| Number | Name | Date |
| --- | --- | --- |
| 2,227,833 | Hixson | Jan. 7, 1941 |